(12) United States Patent
Weber, Sr. et al.

(10) Patent No.: US 8,967,692 B2
(45) Date of Patent: Mar. 3, 2015

(54) METHOD AND APPARATUS FOR LIFTING FLEXIBLE BAGS

(71) Applicants: James P. Weber, Sr., Whitehall, OH (US); James V. Kilmer, Pittsburgh, PA (US)

(72) Inventors: James P. Weber, Sr., Whitehall, OH (US); James V. Kilmer, Pittsburgh, PA (US)

( * ) Notice: Subject to any disclaimer, the term of this patent is extended or adjusted under 35 U.S.C. 154(b) by 0 days.

(21) Appl. No.: 14/204,661

(22) Filed: Mar. 11, 2014

(65) Prior Publication Data

US 2014/0265384 A1 Sep. 18, 2014

Related U.S. Application Data

(60) Provisional application No. 61/777,006, filed on Mar. 12, 2013.

(51) Int. Cl.
*A45F 5/00* (2006.01)
*B65G 7/12* (2006.01)

(52) U.S. Cl.
CPC .................................. *B65G 7/12* (2013.01)
USPC .............................. 294/164; 294/16; 294/119

(58) Field of Classification Search
CPC ............ B66C 1/422; B66C 1/32; B65G 7/12; A47J 45/10; Y10S 294/902
USPC .............. 294/16, 28, 62, 81.61, 87.22, 87.24, 294/106, 113, 117–119, 164
See application file for complete search history.

(56) References Cited

U.S. PATENT DOCUMENTS

| | | | | |
|---|---|---|---|---|
| 1,918,486 A | * | 7/1933 | Onos | 294/87.24 |
| 2,011,127 A | | 8/1935 | Tait et al. | |
| 2,652,715 A | * | 9/1953 | Looze | 52/749.13 |
| 4,109,952 A | * | 8/1978 | Monzain | 294/16 |
| D462,524 S | | 9/2002 | Berke et al. | |
| D463,128 S | | 9/2002 | Berke et al. | |
| 7,240,934 B2 | * | 7/2007 | Lausell | 294/16 |
| 8,083,275 B2 | * | 12/2011 | Myhre et al. | 294/16 |
| 2009/0315353 A1 | * | 12/2009 | Bierman | 294/106 |

* cited by examiner

*Primary Examiner* — Stephen Vu
(74) *Attorney, Agent, or Firm* — Sand & Sebolt

(57) ABSTRACT

A system and method for lifting heavy bags is presented. A heavy bag lifting apparatus includes a handle, a first grabber device, a second grabber device and a plurality of cross-member devices. Each of the first and second grabber devices has a plurality of pin structures. The first grabber device is pivotally connected to the second grabber device. The cross-member devices pivotally connect the first grabber device and second grabber device together. The plurality of cross-member devices are also pivotally connected to the handle. The first grabber device, the second grabber device and plurality of cross-member device are arranged so that pin structures on the first grabber device and the pin structures on the second grabber device are pushed together in proportion to an amount of weight being lifted by the heavy bag lifter apparatus.

13 Claims, 15 Drawing Sheets

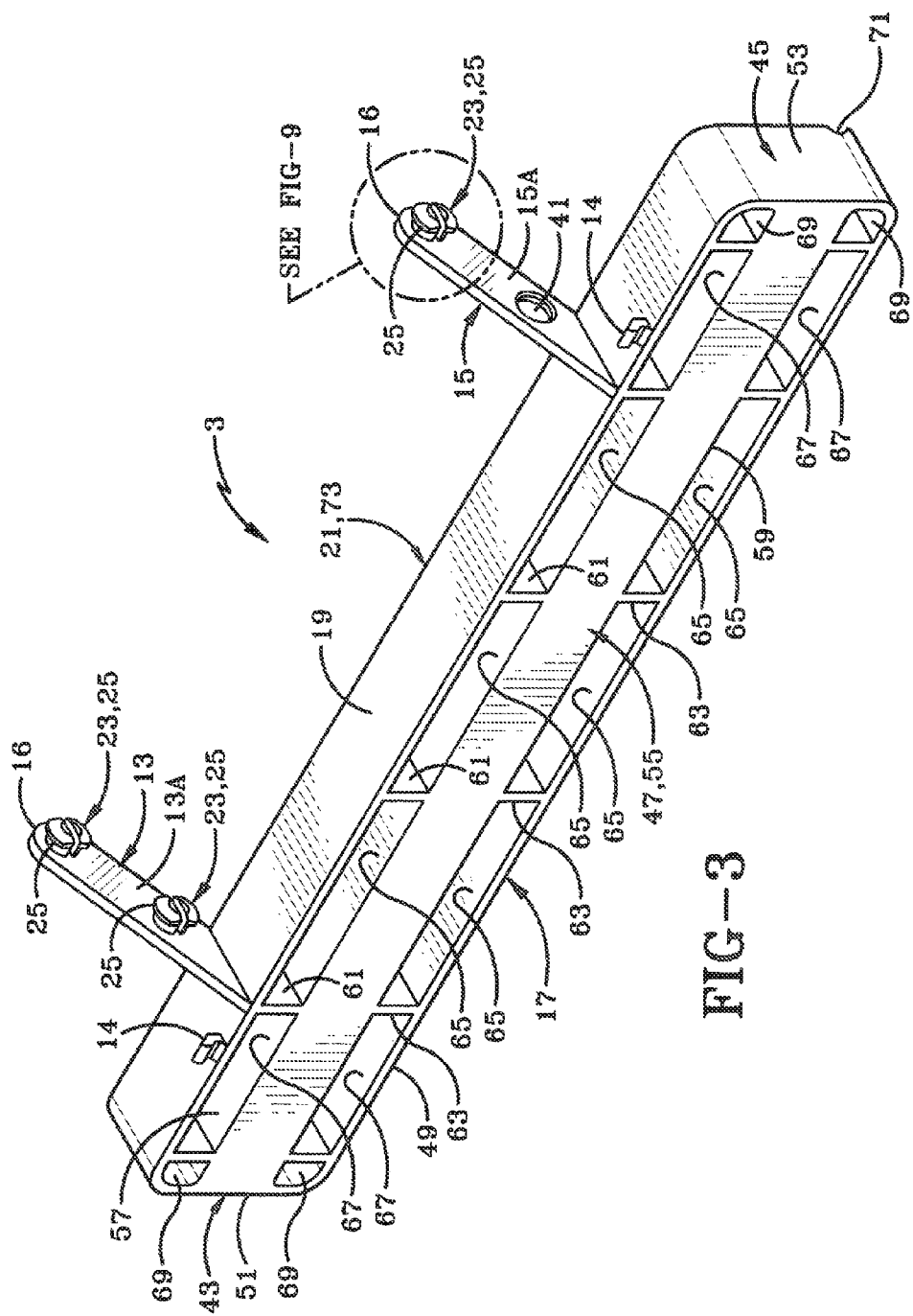

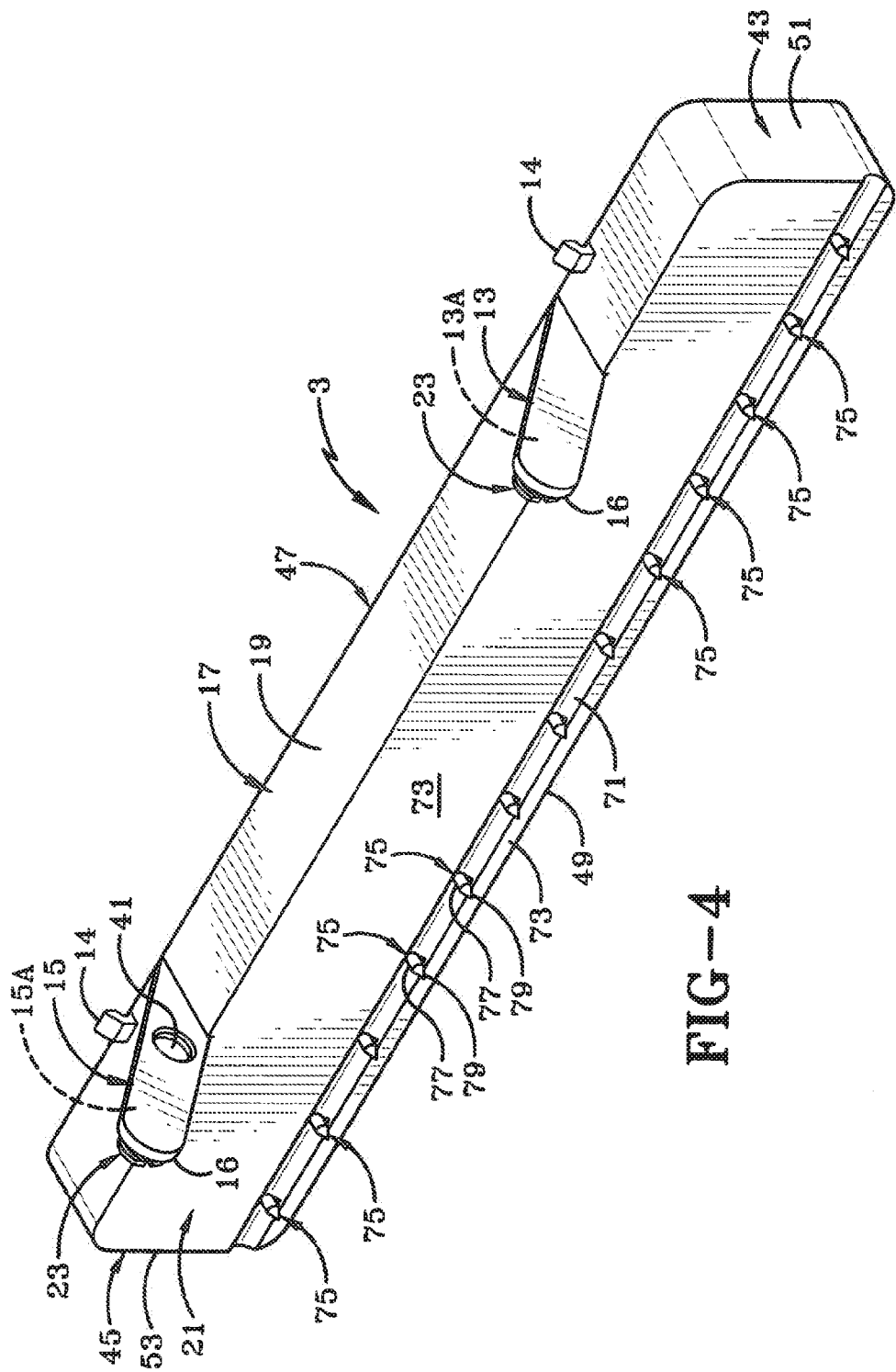

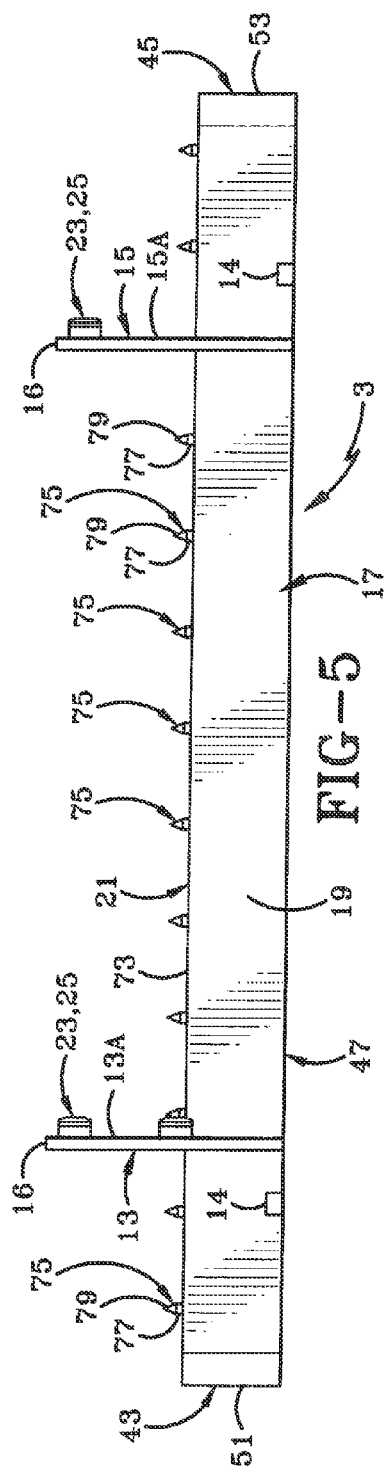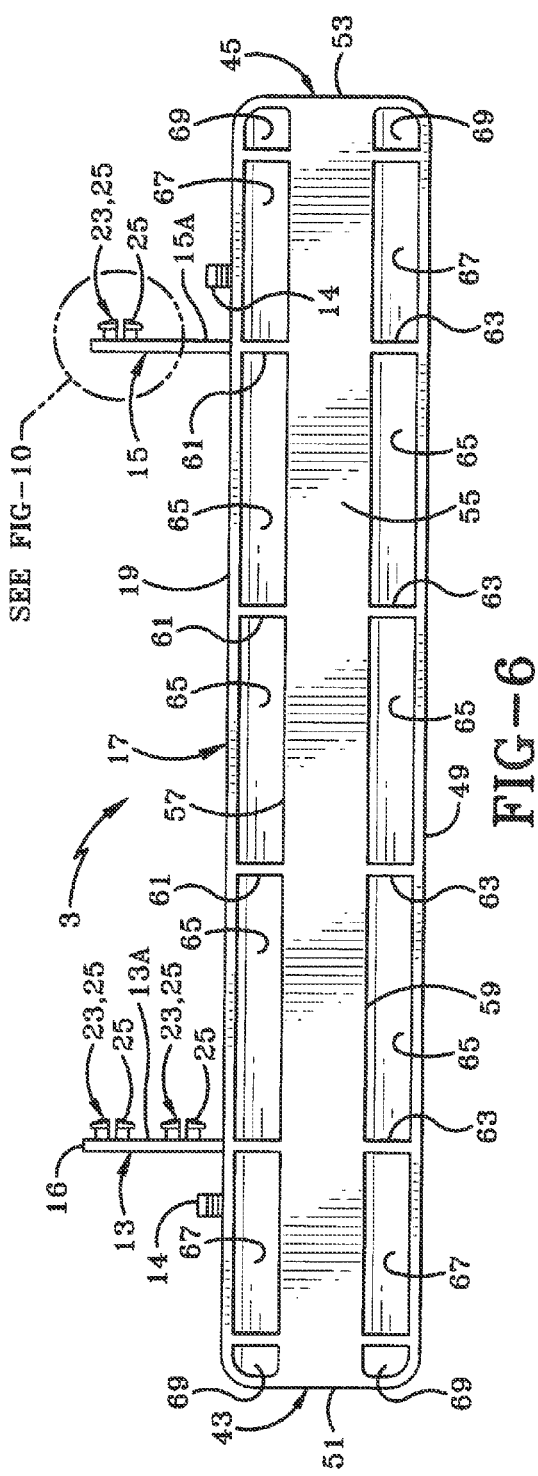

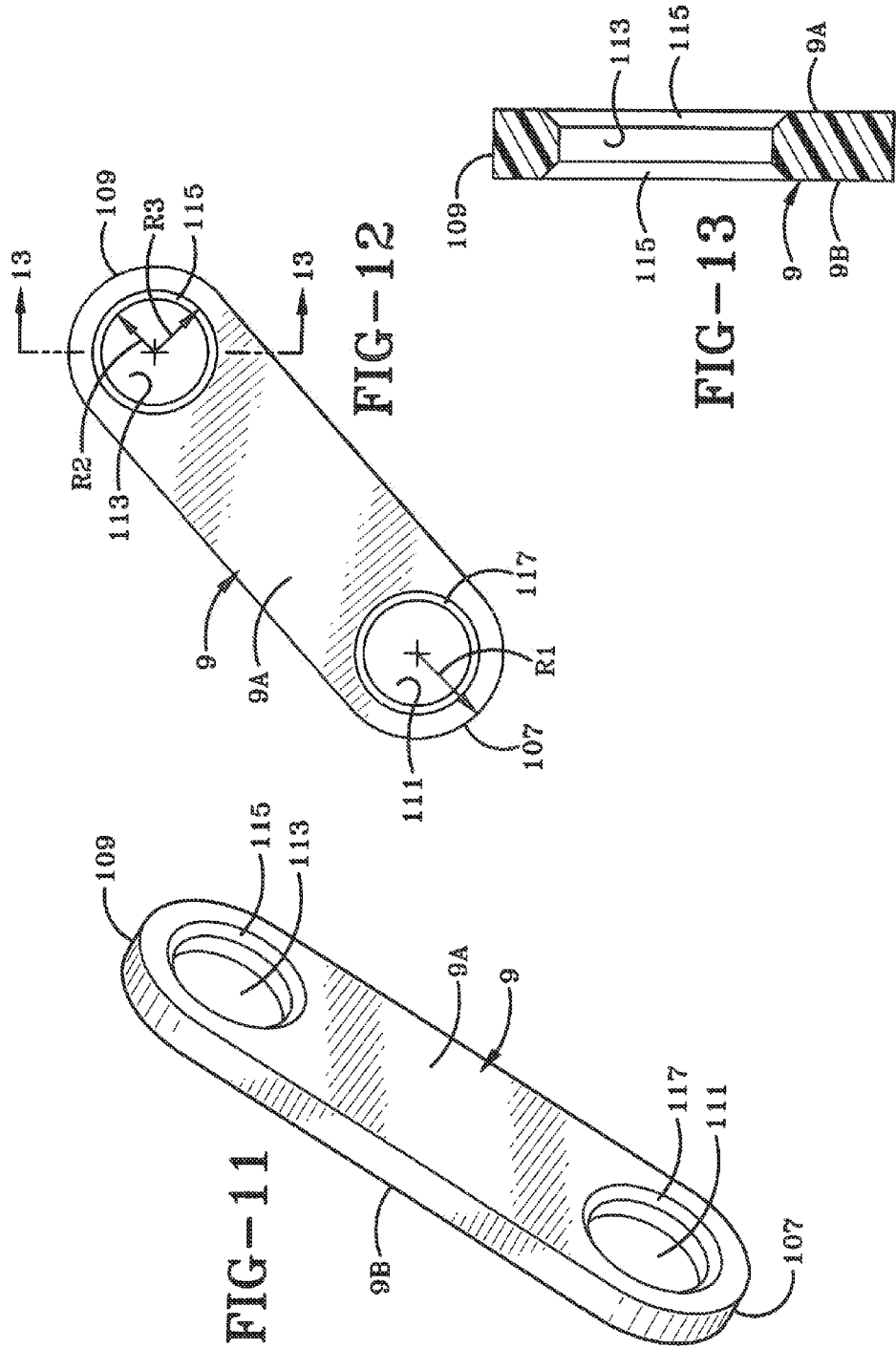

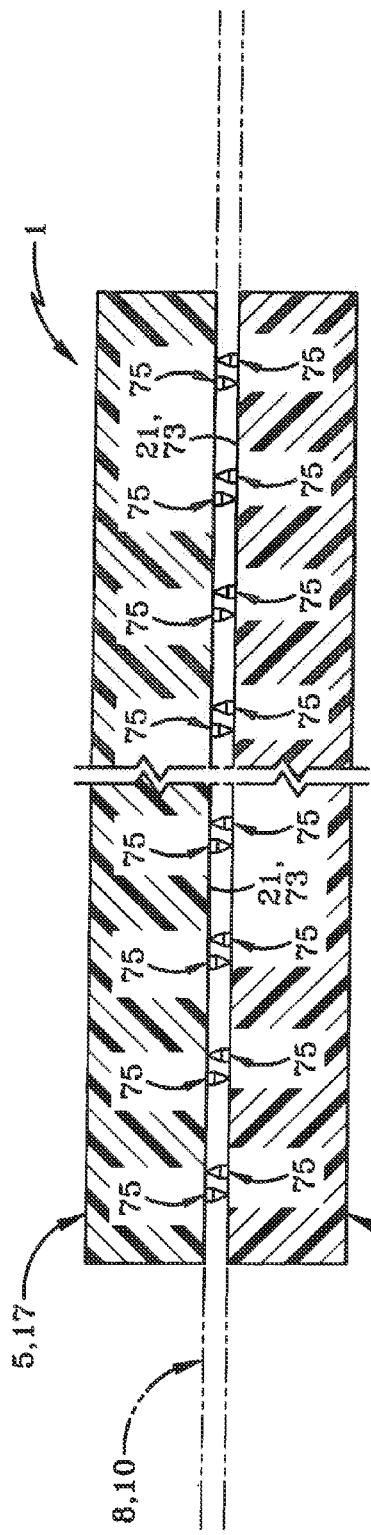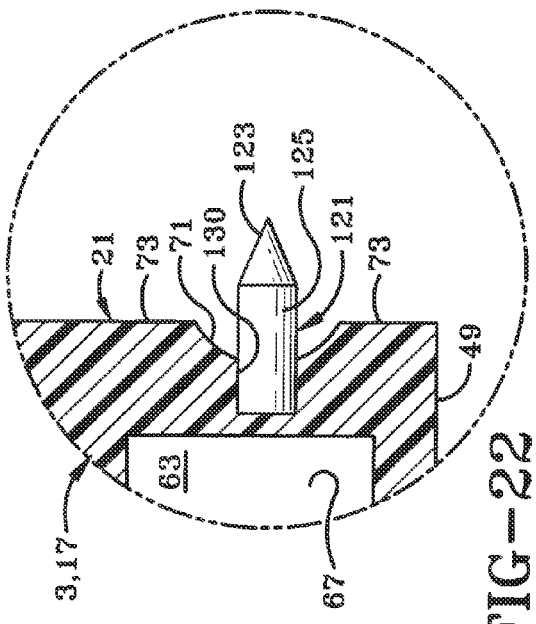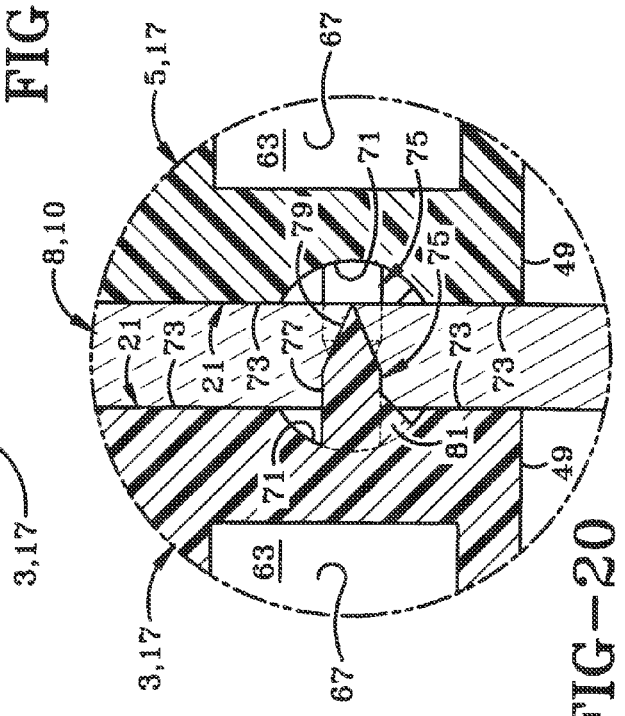

METHOD AND APPARATUS FOR LIFTING FLEXIBLE BAGS

CROSS REFERENCE TO RELATED APPLICATIONS

This patent application claims priority from Provisional Application Ser. No. 61/777,006, filed Mar. 12, 2013; the disclosure of which is incorporated herein by reference.

BACKGROUND OF THE INVENTION

1. Field of Invention

The current invention relates generally to apparatus, systems and methods for lifting objects. More particularly, the apparatus, systems and methods relate to manually lifting heavy objects. Specifically, the apparatus, systems and methods provide for a way of more easily lifting flexible bags filled with material making them heavy.

2. Description of Related Art

For eons, man has been lifting heavy objects. Often a person will bend over at the waist and reach down to lift a heavy object. This causes the lower back muscles to perform much of the lifting. Unfortunately, the lower back muscles are relatively small and often do not have the power to easily lift objects of 25 or more pounds. Secondly, bending at the waist creates a pivot point on discs of the spine in the lower back. Using small back muscles and creating a pivot at the spine often lead to lower back injuries such as a slipped disc in the spine and pulled back muscles. Lifting heavy objects with the knees using larger leg muscles also has its limitations. Squatting at the knees creates pivots between bones at the knees and with repeated lifting can wear out cartilage and bone surfaces in the knees. What is needed is a better way of lifting heavy objects.

SUMMARY

One embodiment of the invention may include a heavy bag lifting apparatus. The heavy bag lifting apparatus includes a handle, a first grabber device, a second grabber device and a plurality of cross-member devices. Each of the first and second grabber devices have a plurality of pin structures. The first grabber device is pivotally connected to the second grabber device. The cross-member devices pivotally connect the first grabber device and second grabber device together. The cross-member devices are also pivotally connected to the handle. The first grabber device, the second grabber device and cross-member devices are arranged so that the pin structures on the first grabber device and the pin structures on the second grabber device are pushed together in proportion to an amount of weight being lifted by the heavy bag lifter apparatus. For example, the cross-member devices, grabber devices and handle are sized and connected together to create an "accordion" type of movement between these components so that the more the heavy bag pulls downward between the two grabber devices, the more they are forced together to more strongly grip the heavy bag. This is discussed further in the detailed description of this application.

Another configuration of the invention may include a method of using a heavy lifter device. The method begins by overcoming small forces created by springs that bias the first and second grabber devices of the heavy lifter device together by pulling apart the first and second grabber devices. The grabber devices then are aligned over a top edge of a bag that someone desires to lift. Next, the grabber devices are released allowing teeth in the devices to be pulled together by the springs. This allows the teeth (or pin structures or saw-shaped teeth) to push into the bag so that the heavy lifter device will be more securely attached to the bag. In the preferred embodiment, the teeth of each grabber device push into a C-shaped channel of the adjacent grabber device. The heavy bag is then easily lifted, by almost any person, with the grabber device. When the bag is lifted, the weight of the bag creates downward force that causes the axis wherein the cross-members are pivotally connected to the two grabber devices to move toward each other resulting in the grabber devices being pushed toward one another. Once the bag is lifted, the method allows for it to be moved to a desired location using the easy to grip handle of the heavy bag lifter. When it is at its desired location, the bag is lowered along with the heavy bag lifter. When the bag's weight is fully supported on the ground, the forces pushing the grabber devices together are released and the grabber devices can be opened by simply overcoming the forces of the springs and the heavy bag lifter can be removed from the bag.

Another configuration of the invention may include a heavy bag lifter that includes first and second grabber devices, a handle and a scissor device. The first and second grabber devices can be placed on opposite side of a bag to be lifted. The scissor device opens the first grabber device and the second grabber device by pulling the first grabber device and the second grabber device apart. The scissor device closes the first grabber device and the second grabber device by pushing the first grabber device and the second grabber together. The scissor device is pivotally connected to the handle and is pivotally connected to the first grabber device and the second grabber device. In some configurations, the heavy bag lifter includes a spring to bias the scissor device to a closed position with the first grabber device and the second grabber device pushed together. In other configurations, the heavy bag lifter has a spring device formed with flat pieces of metal pivotally connected together.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3 illustrates a front perspective view of the preferred embodiment of a grabber device of the heavy bag lifter.

FIG. 4 illustrates a top perspective view of the preferred embodiment of the grabber device of the heavy bag lifter.

FIG. 5 illustrates a top view of the preferred embodiment of the grabber device of the heavy bag lifter.

FIG. 6 illustrates a front view of the preferred embodiment of the grabber device of the heavy bag lifter.

FIG. 11 illustrates a perspective view of a cross-member device of the heavy bag lifter.

FIG. 12 illustrates a side view of the cross-member device of the heavy bag lifter.

FIG. 13 illustrates a cross-sectional view of the cross-member device as taken on cross-section 13-13 in FIG. 12.

FIG. 20 illustrates a detailed cross-sectional view taken from FIG. 19 of pin structures of the grabber devices.

FIG. 21 illustrates a cross-sectional view of the connector devices taken from the bottom of the grabber devices.

FIG. 22 illustrates a detailed cross-sectional view of another configuration of the pin structures of the grabber devices.

Similar numbers refer to similar parts throughout the drawings.

DETAILED DESCRIPTION

Figure 1:
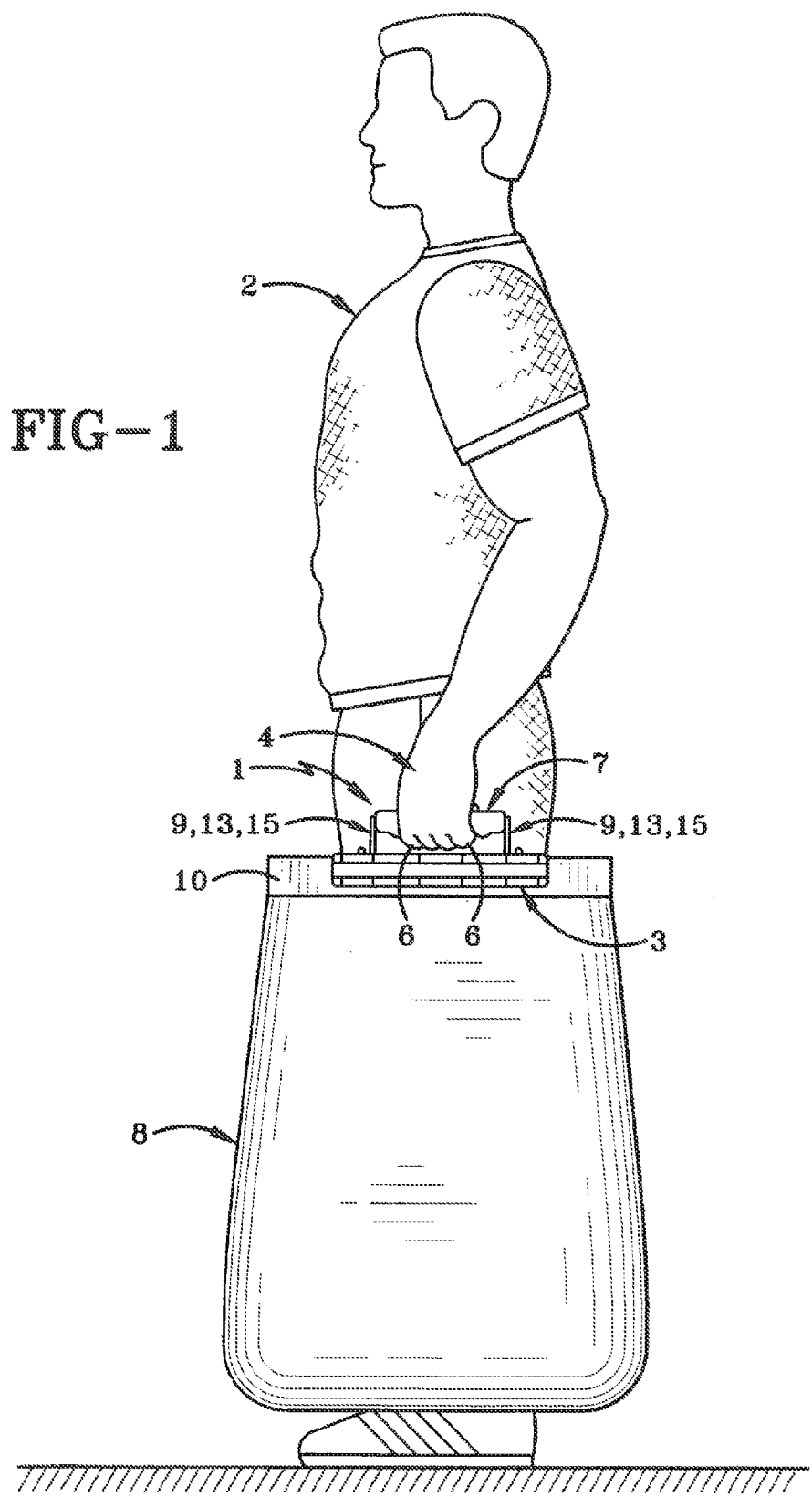
FIG. 1 illustrates a person using a preferred embodiment of a heavy bag lifter apparatus (heavy bag lifter) to lift a bag.
Figure 2:
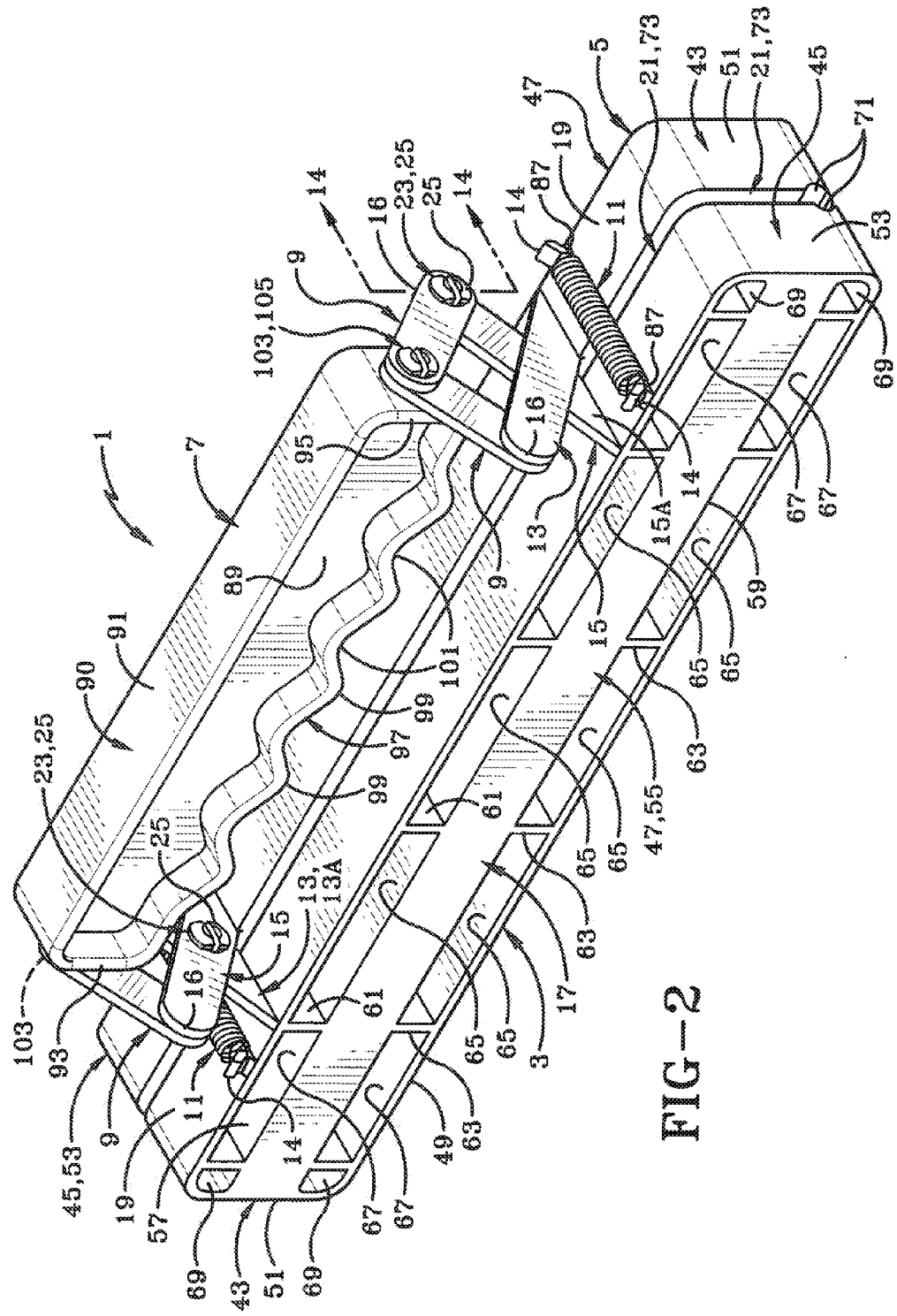
FIG. 2 illustrates a perspective view of the preferred embodiment of the heavy bag lifter.
Figure 7:
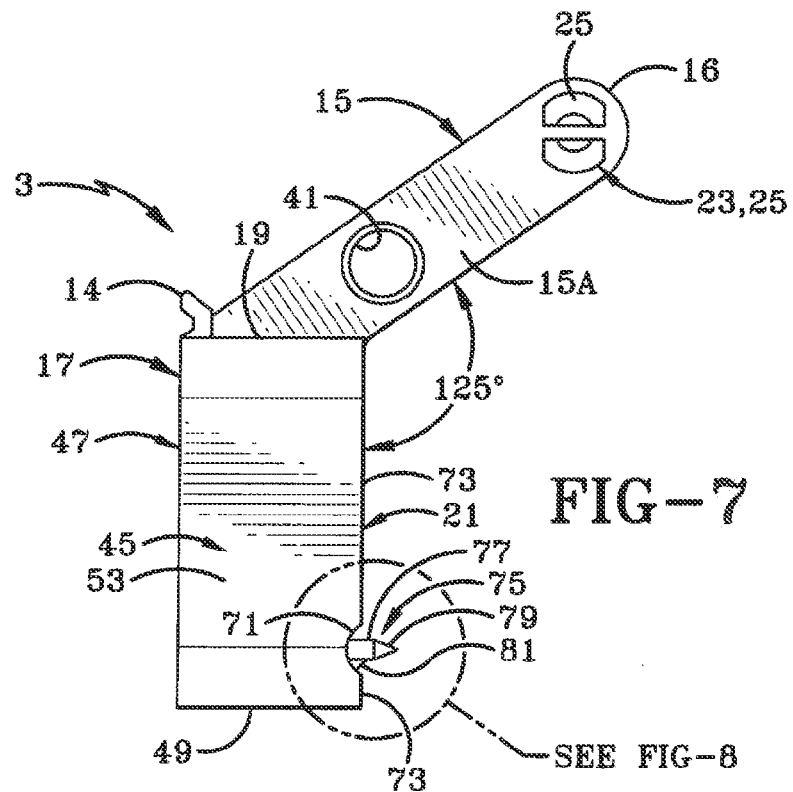
FIG. 7 illustrates a side view of the preferred embodiment of the grabber device of the heavy bag lifter.

FIGS. 1 and 2 illustrate the preferred embodiment of a heavy bag lifter apparatus 1 (heavy bag lifter). The main components of the heavy bag lifter 1 include a first grabber 3, a second grabber 5, a handle 7, four cross-members 9, and two springs 11. FIG. 1 illustrates a person 2 using a hand 4 with fingers 6 to lift a bag 10 filled with heavy material using the heavy bag lifter 1. As discussed later, the heavy bag lifter 1 clamps onto top bag flanges 10 of the bag 8 when the bag is lifted and carried. In the preferred embodiment, the springs 11 are formed out of metal and the other components are formed with ridged Acrylonitrile Butadiene Styrene (ABS) plastic but they could be formed out of metal, another plastic, another material or a combination of one or more different materials.

In the preferred embodiment, the first and second grabber devices 3, 5 are symmetrical so only the first grabber device 3 will be described because the description for the second grabber device 5 is the same. Each grabber device 3, 5 has a first arm 13 and a second arm 15. Each arm 13, 15 is elongated in shape with an outward end 16 projecting outward from its grabber device. The first grabber device 3 includes a first arm 13 and a second arm 15 extending outward from a main body portion 17. The first and second arms 13, 15 both are flat shaped arms that are about 0.08 inches thick about 0.5 inches wide and stick outward from a top side 19 of the first grabber device 3 about 1.07 inches. Cross-members 9 and first and second arms 13 and 15 combine to form a scissors assembly to move grabbers 3 and 5 toward and away from each other. As best seen in FIG. 6, the first and second arms 13, 15 both extend outward from a back side 21 making a 125 degree angle with a back side of the first grabber 3. Of course, when dimensions and sizes of components of the heavy bag lifter 1 are given they only apply to the preferred embodiment. Other dimensions and differently sized components could be used in any number of other different configurations of the preferred embodiment.

Figure 9:
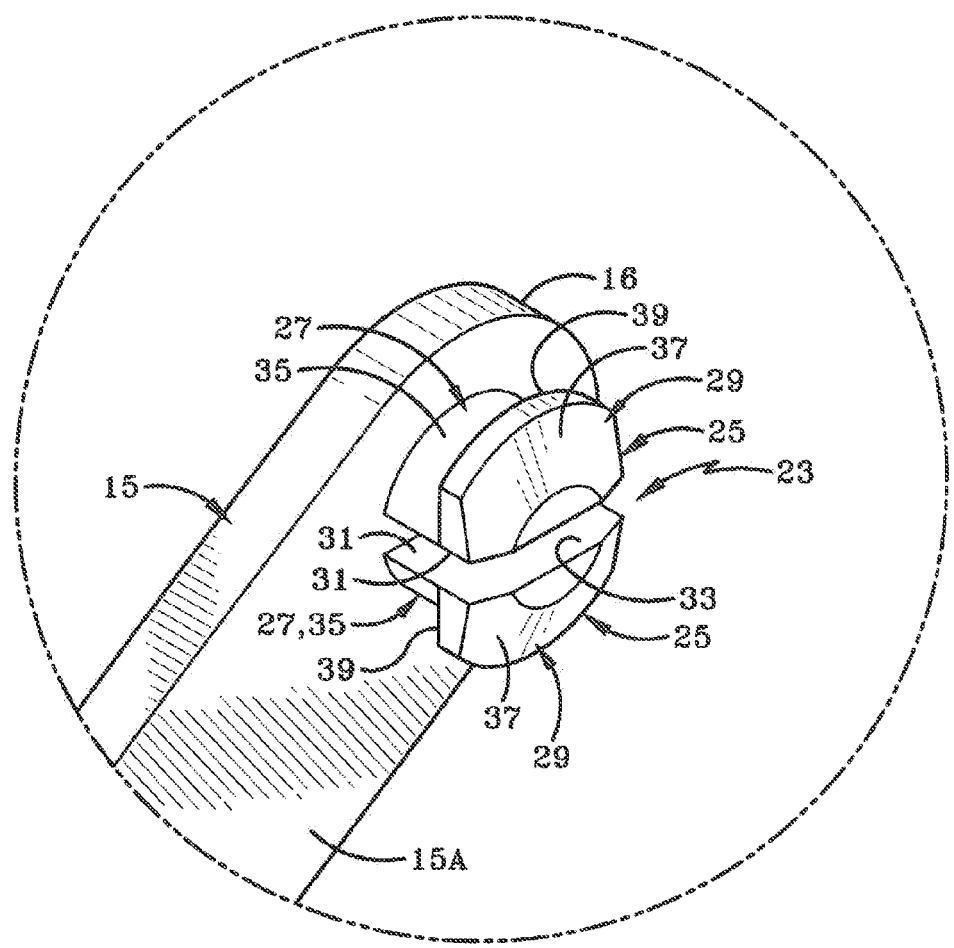
FIG. 9 illustrates a detailed perspective view taken from FIG. 3 of a connector device of the grabber device.
Figure 10:
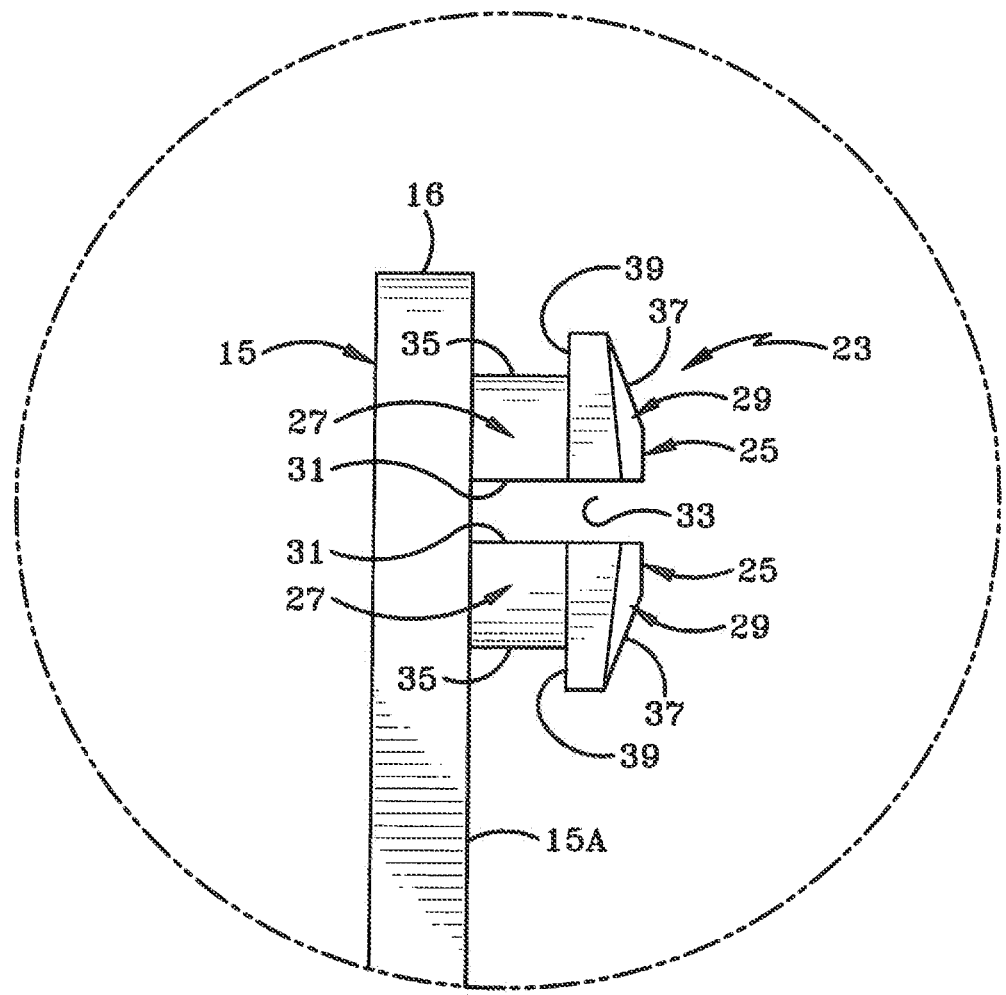
FIG. 10 illustrates a detailed side view taken from FIG. 6 of a connector device of the grabber device.

As best seen in FIG. 3, the first arm 13 has two connector posts 23 extending outward from its right surface 13A and the second arm 15 has one connector devices 23 extending outward from its right surface 15A. As best seen in FIG. 9, each connector device 23 is formed with two generally symmetrical connector halves 25. Each connector half 25 includes an extender portion 27 extending from the first arm 13 and a locking portion 29. The extender portion 27 forms a planar inside wall 31 with the locking portion 23. Each of the connector halves 25 of a connector device 23 are positioned so that each of their inside walls 31 are back-to-back and planar to each other but separated by a distance of about 0.06 inches. This separation forms a gap 33 between the connector halves 25. A curved surface 35 is formed on the extender portion 27 opposite its inside wall 31. Generally spherical surfaces 37 are formed on outward pointing ends of the locking portion 29. A locking surface 39 is formed where the locking portion 29 extends beyond the extender portion 27.

The two connector devices 23 on the first arm 13 are separated with about 0.30 inches between their extender portions 27. The connector device 23 of the second arm 15 has one connector device 23 near its outer end 16 and in the preferred embodiment they are axially aligned with the connector device 23 at the outer end of the first arm 13. The second arm 15 also includes a hole 41 in the shape of a circle that is axially aligned with the connector device 23 on the first arm 13 that is near the top surface of the first grabber device 3. This hole 41 has a diameter of about 0.30 inches and can have sides that are tapered from a circle of about 0.35 inches centered on the hole downward into to the 0.30 inch hole 41.

The first grabber device 3 is generally rectangular in shape with a first end 43 and a second end 45 (FIGS. 3 and 4). In addition to its top side 19 and back side 21, it has a front side 47, a bottom side 49, a left side 51 and a right side 53. In the preferred embodiment, the first grabber device is about 1.53 inches tall, 10 inches long and about 0.72 inches wide with somewhat rounded corners. The top side 19, back side 21, bottom side 49, left side 51 and right side 53 form walls that are formed out of a continuous sheet of material about 0.08 inches thick. The front side is formed out of a central front wall portion 55 that extends horizontally across the front side 47 with gaps of about 0.36 inches between it and the top side 19 and the bottom side 49. In the preferred embodiment, a label or other wording or graphics such as "Heavy Handler" can be formed into the central front wall portion 55. A central top wall portion 57 is located between an upper edge of the central front wall portion 55 and the back side 21 and a central bottom wall portion 59 is located between an upper edge of the central front wall portion 55 and the back side 21 that is parallel to the central top wall portion 57.

Upper interior vertical walls 61 are placed between the central top wall portion 57 and the upper side 21, and lower interior vertical walls 63 are placed between the central bottom wall portion 59 and the bottom side 49. The upper interior vertical walls 61 are aligned with the lower interior vertical walls 63 below them. Upper interior vertical walls 61 and lower internal vertical walls 63 (which are spaced apart from one another by about 2.02 inches) form chambers 64. Upper interior vertical walls 61 and lower internal vertical walls 63 (which are spaced apart from one another by about 1.45 inches) form chambers 67 and are spaced apart from each other by about 1.45 inches. Lower interior vertical walls 63 are similarly positioned with respect to each other. Similarly, upper interior vertical walls 61 and lower internal vertical walls 63 spaced apart from the left side 51 and the right side 53 of the first grabber 3 form chambers 69.

A C-shaped channel 71 (FIG. 4) is formed in the back side 21 between the first end 43 and the second end 45 of the first grabber 3. The C-shaped channel 71 has a radius of about 0.11 inch and extends about 0.14 into the back side 21 from an outermost surface of the back side 21.

Figure 8:
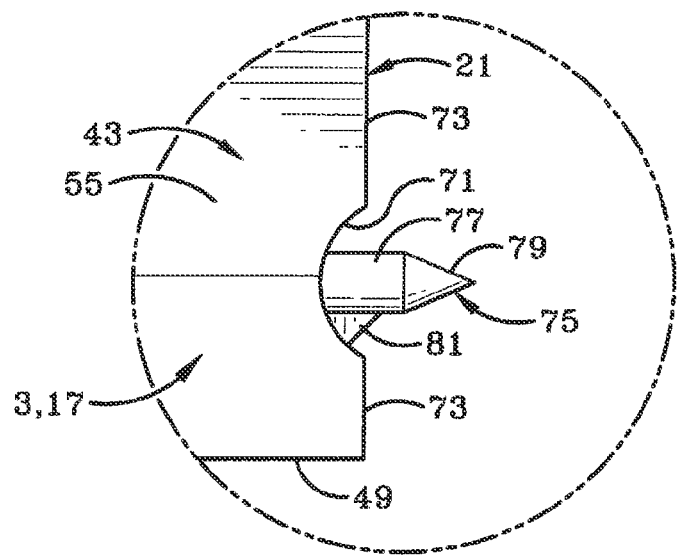
FIG. 8 illustrates a detailed view taken from FIG. 7 of pin structures of the grabber device.

Multiple pin structures 75 (best seen in FIG. 8) are located in and protrude from the C-shaped channel 71. Each pin structure 75 includes a pin rod 77, a pointed end 79 and a supporting wall 81. The cylindrically-shaped pin rods 75 extend outward from the deepest portion of the C-shaped channel 71 and support on their outward ends the pointed ends 79 that are generally cone shaped. Each pin structure 75 has a somewhat triangle-shaped support wall 81 formed between a bottom portion of the pin rod 77 and the C-shaped channel 71. In other embodiments, the pin structures 75 can be saw-tooth in shape or other shapes useful to grab the bag 8 when they are in use as described below. An outer edge 83 of the support wall 81 makes an angle of about 141 degrees with respect to the outer edge of the pin rod. The pin rod 77 is cylindrically-shaped and is about 0.09 inches long and extends a few tenths of an inch out of the channel 71 past the outer surface 73 of the back side so that the pointed end is completely out of the channel. The pointed end 79 is about 0.14 in length beyond the 0.09 inch length of the pin rod 77. The pin structures 75 are evenly distributed in the C-shaped channel with about 0.67 inches between them.

Somewhat L-shaped tabs 14 are formed about 1.55 inches from the left end 43 and the right end 45 of the first grabber device 3. These tabs 14 are shaped so that when the heavy bag lifter 1 is assembled, springs 11 can be stretched between two opposite pairs of the tabs 14 as best seen in FIG. 2. The spring 11 is about 0.25 inch in diameter with about 0.25 inch in diameter loops 87 on each end that attach to the tabs 14. The wire of the spring is about 0.035 of an inch in thickness.

Figure 15:
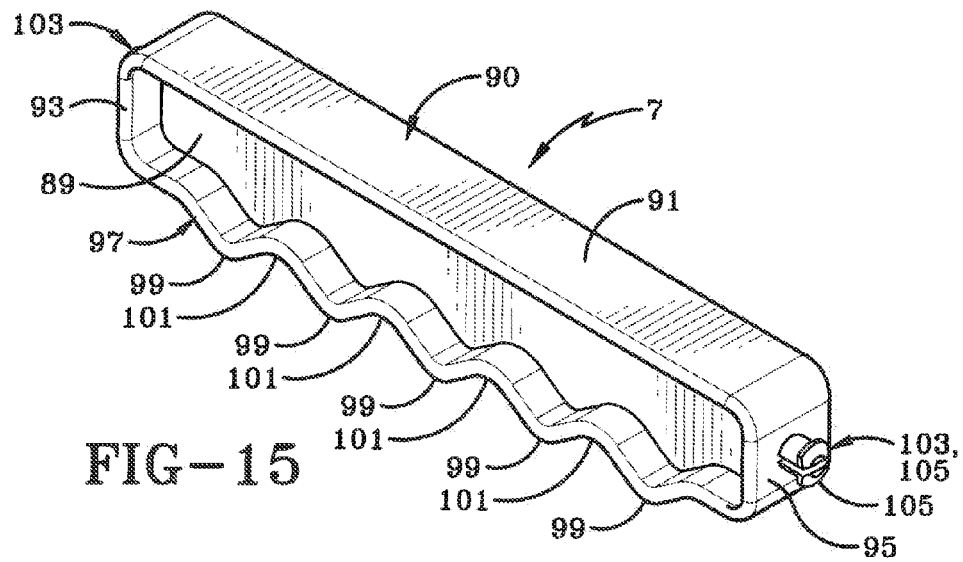
FIG. 15 illustrates a perspective view of the preferred embodiment of a handle of the heavy bag lifter.
Figure 16:
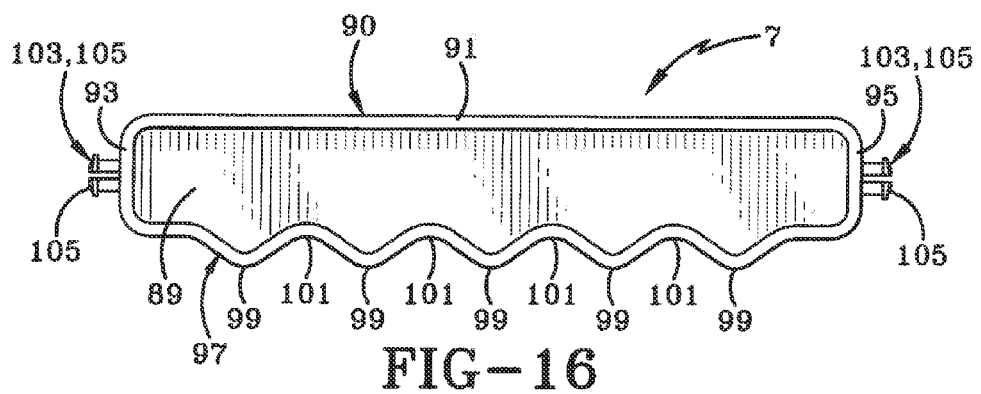
FIG. 16 illustrates a front view of the preferred embodiment of the handle of the heavy bag lifter.
Figure 17:
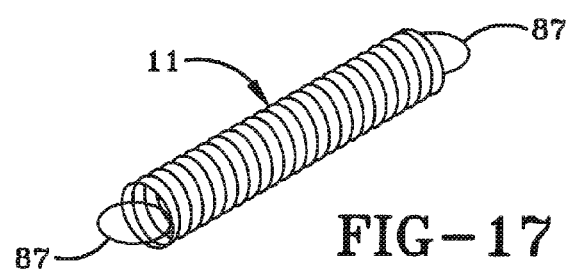
FIG. 17 illustrates a perspective view of the preferred embodiment of a spring of the heavy bag lifter.

As illustrated best in FIGS. 15 and 16, the handle 7 includes a central wall 89. A perimeter wall 90 extends completely around the central wall 89 with equal portions of the perimeter wall 90 extending over both sides of the central wall 89. The perimeter wall 90 includes a top wall 91, left wall 93, right wall 95 and a bottom wall 97. The top wall 91, left wall 93 and right walls 95 are all generally flat in shape except that they form rounded corners where they intersect. The bottom wall 97 is wave-shaped and is formed with alternating convex portions 99 and concave portions 101. These portions are shaped so that average adult fingers could comfortably fit within the four concave portions 101 when griping the assembled heavy bag lifter 1.

A handle connector device 103 is mounted on each of the left wall 93 and the right wall 95. The handle connecter devices 103 are each formed with two connector halves 105. The handle connect device 103 has some dimensions a little larger than the connector device 23 as discussed above, they are otherwise of the dimensions very similar to the connecter device 23. Therefore the detailed discussion of the connector devices 23 discussed above applies to the handle connector devices 105 so they are not discussed in any further detail. Excluding the handle connector devices 103, the handle 7 has an overall length of about 6 inches and a width (depth) of about 0.78 inches and a height of about 1.24 inches.

The cross-members 9 (FIGS. 11-13) are flat pieces of material of about 0.08 inches thickness having a right side 9A and left side 9B. They are elongated with rounded first ends 107 and second ends 109. A round first opening 111 is located near the first end with a radius R1 of about 0.22 inches and a round second opening 113 is located near the second end 109 with a radius R2 of about 0.30 inches. The second opening 113 can be formed with beveled edges 115 on each side 9A, 9B. The beveled edges 115 extend from a radius R3 of about 0.35 inches to about 0.03 inches to a radius R2 of about 0.30 inches as illustrated. The first opening 111 can have similar beveled edges 117 appropriate for its radius R1 on both sides 9A, 9B of the cross-member.

FIG. 22 illustrates a second configuration of the preferred embodiment where metallic pins 121 are inserted into holes 130 formed in the first grabber device 3 and the second grabber device 5 in places where the pin structures 75 of the preferred embodiment would have been formed as part of the first grabber devices 3, 5 themselves. The pins 121 are formed with conical-shaped pin ends 123 adapted to grab the tabs ends 10 of the bag 8 and cylindrically-shaped bases 125 that are inserted into the holes 130 of the first grabber device 3 and the second grabber device 5.

Of course, as mentioned earlier, other components of the heavy bag lifter 1 or other portions of other components could be formed out of other material or partly formed out of other materials in other configurations of the preferred embodiment.

Figure 18:
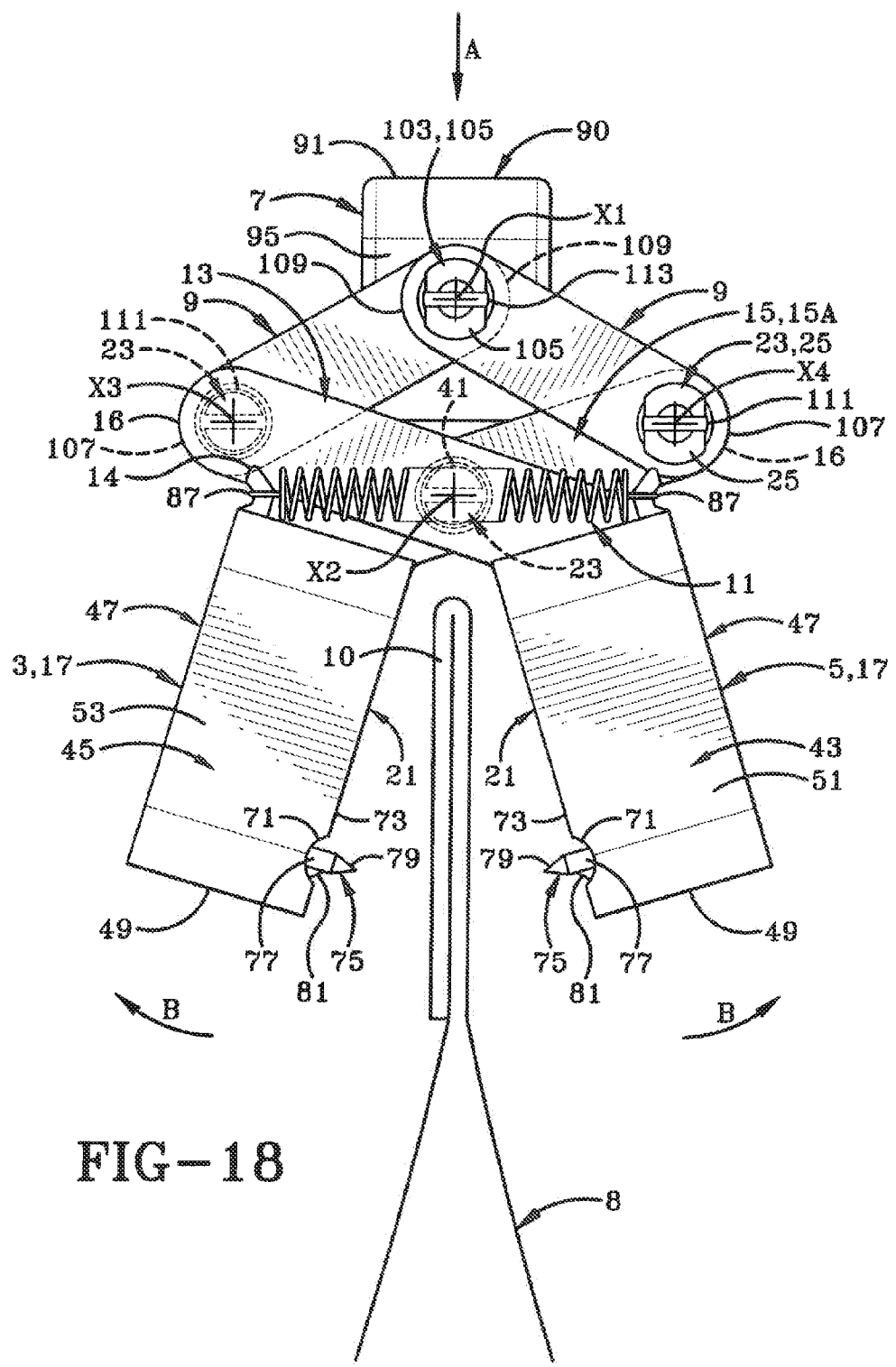
FIG. 18 illustrates a side view of the preferred embodiment of the heavy bag lifter moving to an open position.
Figure 19:
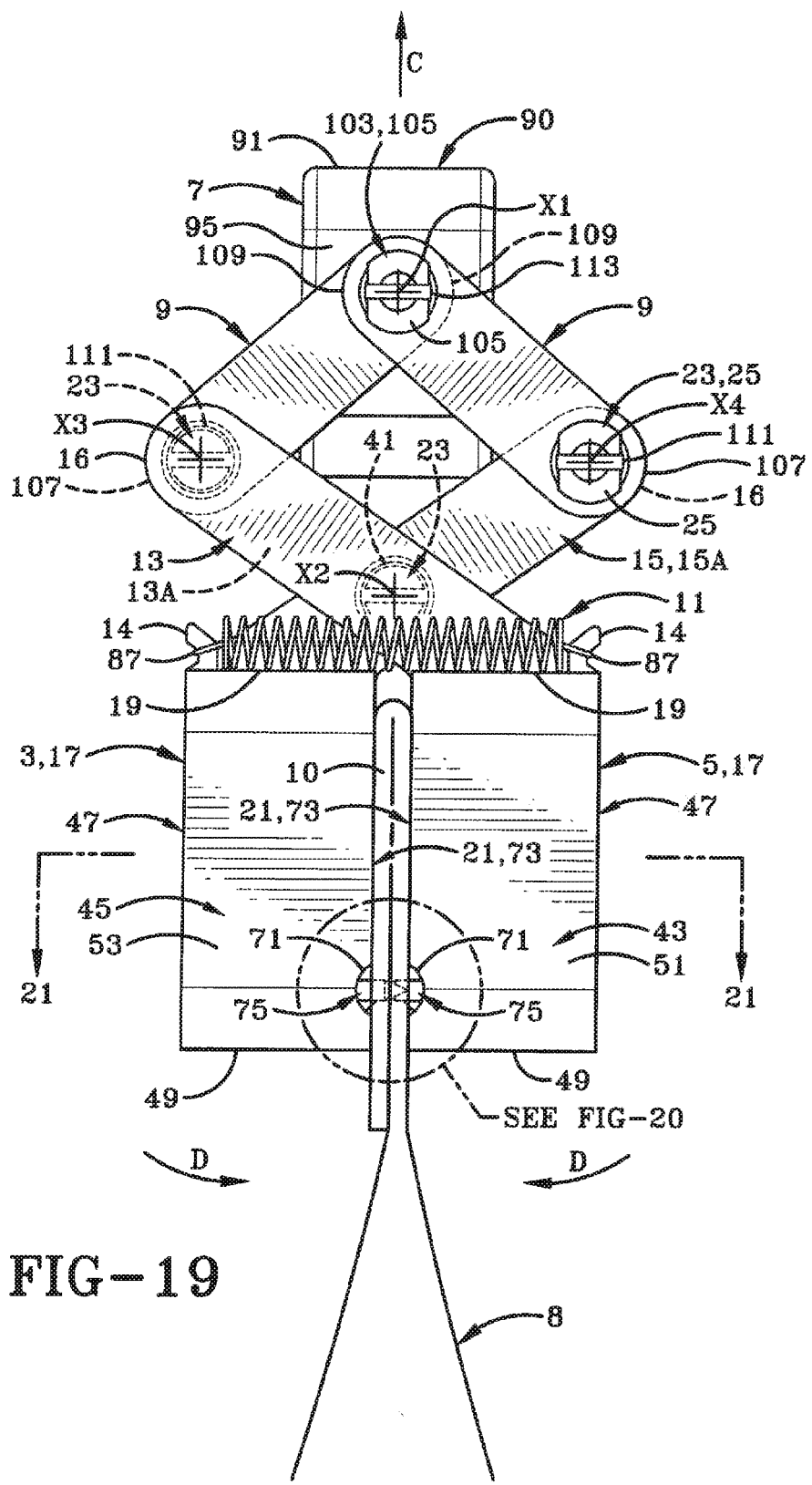
FIG. 19 illustrates a side view of the preferred embodiment of the heavy bag lifter moving to a closed position.

Having described the components of the heavy bag lifter 1, its assembly will now be described and its use will be described with reference to a method. The heavy bag lifter 1 can be assembled by snap-fitting the various components together. For example, the first and second grabbers 3, 5 can be aligned so that their back sides 21 are opposite each other (best viewed in FIG. 2), however, they would be offset from one another. Next, the lower connector devices 23 closest to the top side 19 of each grabber device 3, 5 are pushed toward the hole 41 on the adjacent second arm of each grabber device 3, 5. As each connector device 23 is passed through the respective hole 41 the outer end of each locking portion 29 (FIG. 9) are pushed toward each other at least partially closing the gap 29. Once the locking portions 29 of the connector devices 23 has each passed all the way through the respective opposite hole 41 of adjacent second arm 15, its locking portions 29 will be free to move back into their original outward positions recreating the original gap 33. Now in this original position, the locking surface 39 of the locking portions 29 of the connector devices 23 extend over the sides around each hole 41 of each respective second arm of the first and second grabbers 3, 5. When connected together an axis of rotation X2 is created between the first and second connection devices 3, 5 as best seen in FIGS. 18 and 19.

Figure 14:
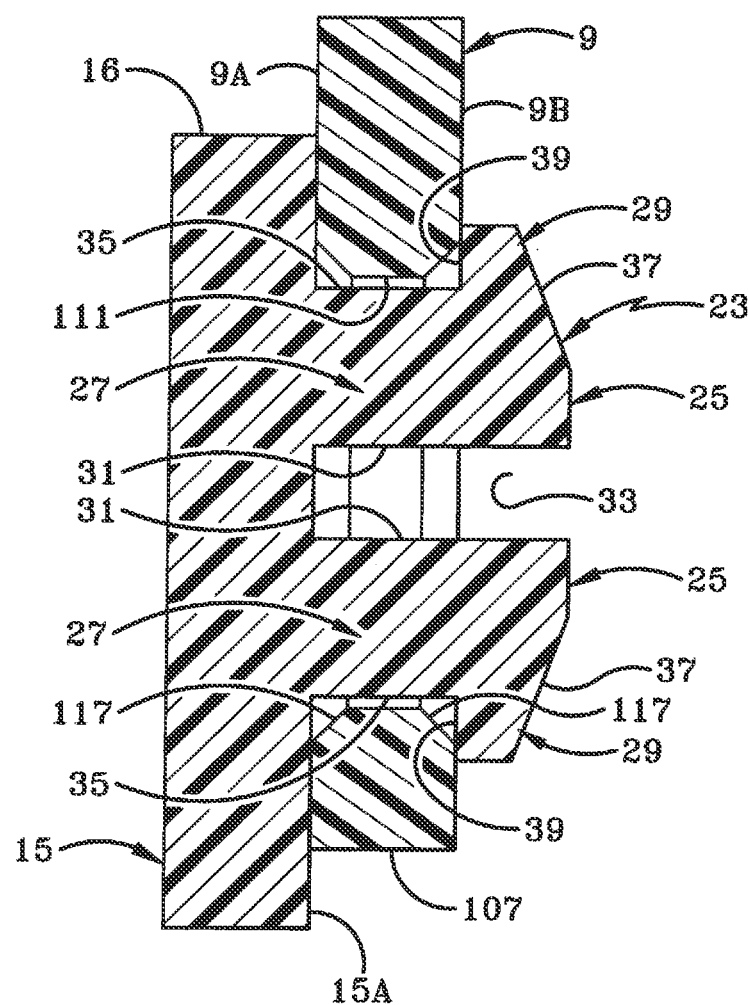
FIG. 14 illustrates a cross-sectional view of a connection device in a second grabber device connected to an end of a cross-member.

Next, one end of a cross-member 9 may be attached to a connector device 23 at each end 16 of the first and second arms 13, 15 of each of the first and second grabbers 3, 5. As discussed above, these connector devices 23 are slid through the first openings 111 at the first ends 107 of each cross-member 9 and are locked into place similar to how the lower connector devices 23 are slide through holes 41 of the second arms 15 and are locked into place as described above. FIG. 14 illustrates how the locking surface 39 of its respective connector device 23 is extended over the left side 9B of a cross-member 9 to prevent that connector device 23 from being withdrawn from that first opening 111. When connected together an axis of rotation X3 and X4 are created at the outer ends 16 of the first and second arms 13, 15 and the first ends 107 of respective cross-members 9 connected to them as best seen in FIGS. 18 and 19.

Next, pairs of the second openings 113 at the second ends 109 on each of the first and second arms 13, 15 are axially aligned with each other. The pairs of cross-members 9 with aligned second openings 113 are aligned respectively with a handle connector device 103 at each end of the handle 7. Each respective pair of cross-members 9 are then pressed onto the handle connector devices 103 until each pair of cross-members 9 is snap-fitted to the handle connector device 103. Each connector half 105 of each handle connector device 103 is pressed together and then locked to the cross-members 9 similar to how the connector devices 23 were locked to the first and second arms 13, 15 of the first and second grabber devices 3, 5 as discussed above. When connected together an axis of rotation X1 is created between the second ends 109 of the cross-members and corresponding ends of the handle as best seen in FIGS. 18 and 19. Finally, springs 11 may be fitted between pairs of tabs 14 located on each of the first and second grabber devices 3, 5 as best seen in FIG. 2.

The use of the heavy bag lifter 1 will now be described with reference to an example method illustrated in FIG. 23. Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 23:
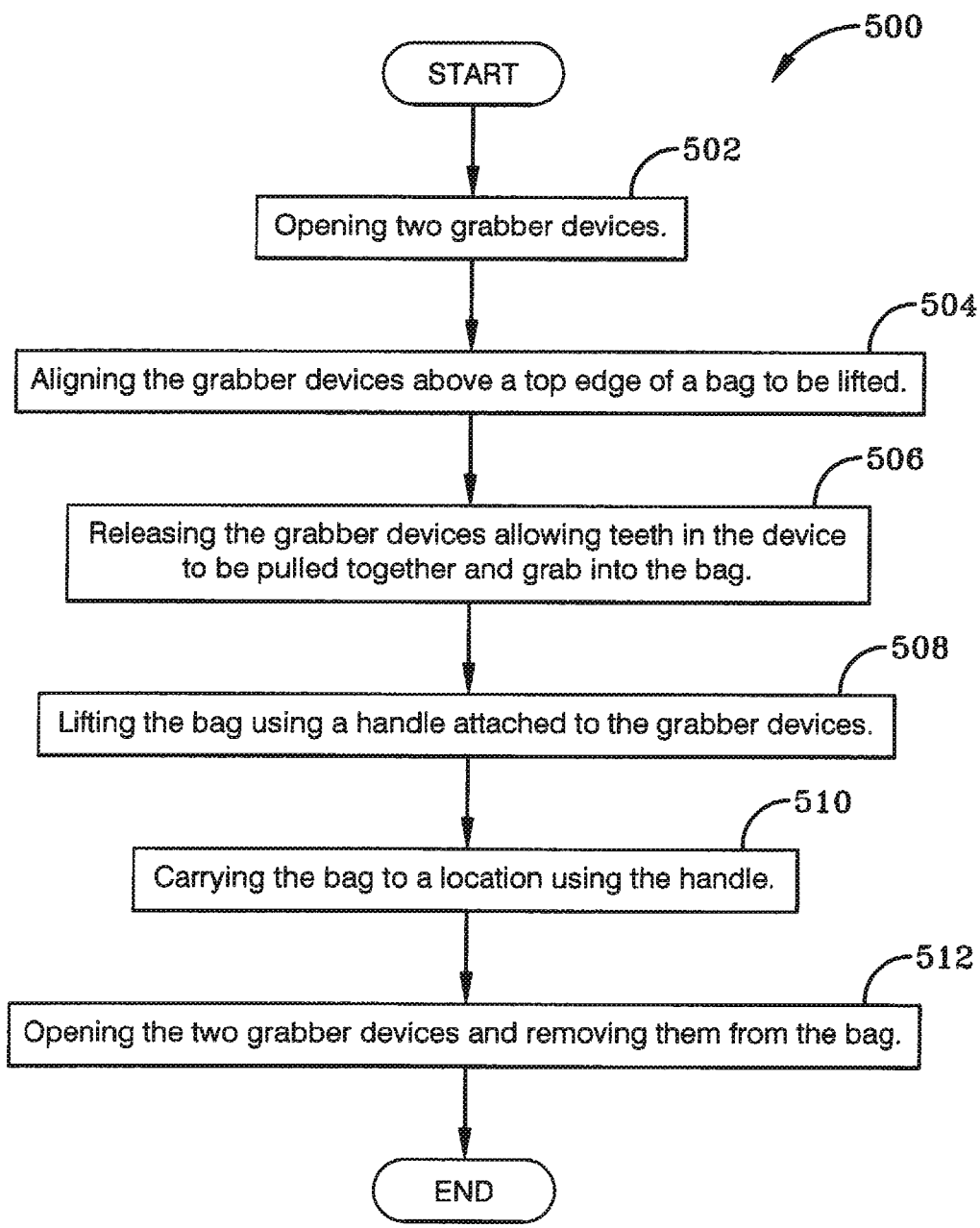
FIG. 23 illustrates an embodiment of a method for moving heaving bags using the preferred embodiment of the heavy bag lifter.

FIG. 23 illustrates a method 500 of using the heavy lifter device 1 discussed above. The method 500 begins, at 502, by overcoming small forces created by the springs 11 and pulling apart the first and second grabber devices 3, 5 of the heavy bag lifter 1. For example and as illustrated in FIG. 18, the grabber devices 3, 5 can be pulled apart in the directions of arrows B. In some configurations, when the grabber devices 3, 5 and the cross-members 9 are sized properly the springs 11 can act to hold the grabber devices in an open position once they are opened far enough for the springs 11 actually act to hold the gabber devices 3, 5 in an open position. In particular, if the centers of the springs 11 are moved above axis X2 (best seen in FIG. 18), then they act to hold gabber devices 3, 5 in an open position. The grabber devices 3, 5 are aligned over the top edge 10 of a bag 8, at 504, that someone desires to lift. For example, the grabber devices 3, 5 then can be lowered in the direction of arrow A (FIG. 18) so that the grabber devices 3, 5 are on opposite sides of the upper edge 10 of the bag 8.

The grabber devices 3, 5 are released (or moved toward each other), at 506, allowing teeth in the devices to be pulled (or pushed) together in the direction of arrows D. This allows the teeth (or pin structures 75 or saw-teeth) to push into the bag so that the heavy lifter device 1 will be more securely attached to the bag 8. In the preferred embodiment, the teeth of one grabber device push into a C-shaped channel of an adjacent grabber device as best seen in FIGS. 19 and 20. Notice also in FIG. 21 that the pin structures 75 of the first grabber device are offset from the pin structures 75 of the other adjacent second grabber device 5.

The heavy bag lifter 1 is lifted with its handle 7, at 508, in the direction of arrow C. When the bag 8 is lifted, the weight of the bag 8 creates downward force that causes axis X3 and X4 to move toward each other resulting in the grabber devices 3, 5 being pushed toward one another. Due to the geometry of the components of the heavy bag lifter 1 and the location of the connection points of their various axis X1, X2, X3 and X4 the more downward force that is generated (e.g., the heavier the bag 8) the more strongly the two grabber devices 3, 5 are pushed toward each other. For example, the cross-member devices 9, first and second grabber devices 3, 5 and the handle 7 are sized and connected together to create an "accordion" type of movement between these components so that the more the heavy bag 8 pulls downward between the two grabber devices 3, 5 the more they are forced together to more strongly grip the heavy bag 8. The "accordion" type of movement that presses the first and second grabber devices 3, 5 together is primarily formed by the cross-members 9 and the first and second arms 13, 15 of the grabber devices 3, 5. In the preferred embodiment, when assembled the cross-members 9 and the first and second arms 13, 15 form a parallelogram with pivots at its four corners X1, X2, X3, X4.

Once the bag 8 is lifted, the method 500 allows, at 510, for it to be moved to a desired location using the easy to grip handle 7 of the heavy bag lifter 1. When it is at its desired location, the bag 8 is lowered along with the heavy bag lifter 1. When the bag's weight is fully supported on the ground, the forces pushing the grabber devices 3, 5 together are released and the grabber devices can be opened by simply overcoming the forces of the springs 11 and the heavy bag lifter 1 can be removed from the bag 8.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the represented embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A heavy bag lifting apparatus comprising:
a handle with a first end and a second end;
a first grabber with two outward extending arms;
a first plurality of gripper structures formed on the first grabber;
a second grabber with two outward extending arms;
a second plurality of gripper structures formed on the second grabber;
two arms of the first grabber pivotally connected to the two arms of the second grabber;
four cross-members, wherein one each of the cross-member is each pivotally connected to the two arms of the first grabber and the two arms of the second grabber so that one cross-member is connected to each of the two arms for the first grabber and the two arms of the second grabber, wherein two of the four cross-members are pivotally connected to the first end of the handle and the other two cross-members members are pivotally connected to the second end of the handle; and wherein the first grabber and the second grabber are adapted to be placed on opposite sides of a bag to be lifted;

a spring to pull the first grabber toward the second grabber; and a tab formed on the two arms of the first grabber and wherein the spring is attached between one of the tabs formed on the two arms of the first grabber and one of the two arms of the second grabber.

2. The heavy bag lifting apparatus of claim 1 wherein the first plurality of gripper structures further comprises:

a plurality of pointed teeth.

3. The heavy bag lifting apparatus of claim 2 wherein the plurality of pointed teeth further comprises:

an equally spaced apart plurality of pointed teeth.

4. The heavy bag lifting apparatus of claim 1 wherein the equally spaced apart plurality of pointed teeth further comprises:

an equally spaced apart plurality of pointed teeth that are made out of a single piece of metal.

5. The heavy bag lifting apparatus of claim 1 wherein the two outward extending arms of the first grabber further comprises:

two outward extending arms that extend outward from the first grabber at about a 45 degree angle.

6. The heavy bag lifting apparatus of claim 1 wherein the first grabber further comprises:

a first grabber that is generally rectangle in shape.

7. The heavy bag lifting apparatus of claim 6 wherein the first grabber is formed out of wood.

8. The heavy bag lifting apparatus of claim 1 wherein the two arms of the first grabber further comprises:

two arms of the first grabber that are made of metal.

9. The heavy bag lifting apparatus of claim 1 wherein the two arms of the first grabber wrap at least partly around four of four sides of the first grabber.

10. The heavy bag lifting apparatus of claim 1 wherein the cross-members are pivotally connected to outward ends of the two arms of the first grabber and to outward ends of the two arms of the second grabber.

11. The heavy bag lifting apparatus of claim 1 wherein the first grabber is generally rectangle in shape and about 1.5 inches tall, about 10 inches in length and about 3/8 of an inch thick.

12. A heavy bag lifting apparatus comprising:

a handle with a first end and a second end;

a first grabber with two outward extending arms;

a first plurality of gripper structures formed on the first grabber;

a second grabber with two outward extending arms;

a second plurality of gripper structures formed on the second grabber;

two arms of the first grabber pivotally connected to the two arms of the second grabber;

four cross-members, wherein one each of the cross-member is each pivotally connected to the two arms of the first grabber and the two arms of the second grabber so that one cross-member is connected to each of the two arms for the first grabber and the two arms of the second grabber, wherein two of the four cross-members are pivotally connected to the first end of the handle and the other two cross-members are pivotally connected to the second end of the handle;

wherein the first grabber and the second grabber are adapted to be placed on opposite sides of a bag to be lifted; and plastic pins connecting the two arms of the first grabber to the two arms of the second grabber and the four cross-members to the two arms of the first grabber and the two arms of the second grabber.

13. A heavy bag lifting apparatus comprising:

a handle with a first end and a second end;

a first grabber with two outward extending arms;

a first plurality of gripper structures formed on the first grabber;

a second grabber with two outward extending arms;

a second plurality of gripper structures formed on the second grabber;

two arms of the first grabber pivotally connected to the two arms of the second grabber;

four cross-members, wherein one each of the cross-member is each pivotally connected to the two arms of the first grabber and the two arms of the second grabber so that one cross-member is connected to each of the two arms for the first grabber and the two arms of the second grabber, wherein two of the four cross-members are pivotally connected to the first end of the handle and the other two cross-members are pivotally connected to the second end of the handle;

wherein the first grabber and the second grabber are adapted to be placed on opposite sides of a bag to be lifted; and plastic pins connecting the two arms of the first grabber to outward ends of the two arms of the second grabber, wherein the pins are located at central locations of the first grabber at central locations of the two arms of the second grabber.

* * * * *

UNITED STATES PATENT AND TRADEMARK OFFICE
CERTIFICATE OF CORRECTION

PATENT NO.         : 8,967,692 B2                                      Page 1 of 1
APPLICATION NO.    : 14/204661
DATED              : March 3, 2015
INVENTOR(S)        : Weber, Sr. et al.

It is certified that error appears in the above-identified patent and that said Letters Patent is hereby corrected as shown below:

In the Claims

Column 9, line 5 (Claim 1) change "two cross-members members" to --two cross-members--

Signed and Sealed this
Ninth Day of June, 2015

Michelle K. Lee
*Director of the United States Patent and Trademark Office*